(12) United States Patent
Castagno et al.

(10) Patent No.: US 7,360,814 B2
(45) Date of Patent: Apr. 22, 2008

(54) INTERIOR SPACE EXPANSION SYSTEM

(76) Inventors: Leo L. Castagno, 3942 W. 1000 N., Rexburg, ID (US) 83440; Melvin Price, 1449 S. Industrial Pkwy., Heber City, UT (US) 84032; James L. Spillman, 1286 E. Manfield Way, Draper, UT (US) 84020; Bradley M. Price, 211 E. Greenfield Cir., #122, Heber City, UT (US) 84032; Robert L. Bonner, 21941 W. Beacon La., Wittman, AZ (US) 85361

(*) Notice: Subject to any disclaimer, the term of this patent is extended or adjusted under 35 U.S.C. 154(b) by 175 days.

(21) Appl. No.: 11/164,734

(22) Filed: Dec. 2, 2005

(65) Prior Publication Data

US 2007/0126252 A1    Jun. 7, 2007

(51) Int. Cl.
   *B62D 33/08* (2006.01)
(52) U.S. Cl. .................. 296/26.05; 296/26.04
(58) Field of Classification Search ............ 296/165, 296/172, 173, 176, 26.04, 26.05, 26.06, 26.07
   See application file for complete search history.

(56) References Cited

U.S. PATENT DOCUMENTS

| | | | |
|---|---|---|---|
| 2,931,456 A | 4/1960 | Harmon | |
| 3,547,225 A | 12/1970 | Deane | |
| 3,601,235 A | 8/1971 | Huf | |
| 3,608,954 A * | 9/1971 | Lynd | 296/26.05 |
| 3,653,302 A | 4/1972 | Notenboom | |
| 3,675,899 A | 7/1972 | McKendrick | |
| 3,789,955 A | 2/1974 | Knapp | |
| 3,826,095 A | 7/1974 | Clark | |
| 3,836,122 A | 9/1974 | Pierce, Jr. | |
| 3,920,096 A | 11/1975 | Fisher | |
| 3,985,202 A | 10/1976 | Harmon | |
| 4,063,619 A | 12/1977 | Drews | |
| 4,222,458 A | 9/1980 | Pratt | |
| 4,424,751 A | 1/1984 | Blochlinger | |
| 4,464,898 A | 8/1984 | Aoyagi et al. | |
| 4,563,121 A | 1/1986 | Drews | |
| 4,579,503 A | 4/1986 | Disque | |
| 4,624,447 A | 11/1986 | Richmeier | |
| 4,711,282 A | 12/1987 | Frazier et al. | |
| 4,715,180 A | 12/1987 | Rosman | |
| 4,850,570 A | 7/1989 | Cabanos et al. | |
| 4,967,733 A | 11/1990 | Rousseau | |

(Continued)

*Primary Examiner*—Lori L. Lyjak
(74) *Attorney, Agent, or Firm*—Advantia Law Group; Michael W. Starkweather; Jason P. Webb

(57) ABSTRACT

An interior space expansion system for use with a structure needing collapsible and/or expandable space, including: a base structure having an aperture therethrough; a movable structure disposed within a central region of the base structure when in a sunken position and substantially exterior the base structure when in an elevated position; and a lifting system coupled to the base structure and the movable structure. The base structure is a trailer or recreational vehicle. The movable structure includes a cab a carriage and a footing. The lifting system couples to the footing and transitions the movable structure between the sunken and elevated positions. The lifting system is not substantially disposed within the central region of the base structure when the movable structure is in the elevated position. There is a cap member for covering the aperture when the movable structure is in the sunken position.

16 Claims, 6 Drawing Sheets

U.S. PATENT DOCUMENTS

| | | |
|---|---|---|
| 5,092,731 A | 3/1992 | Jones et al. |
| 5,110,251 A | 5/1992 | Gray |
| 5,111,906 A | 5/1992 | Abadia |
| 5,135,278 A * | 8/1992 | Kauffman et al. .......... 296/173 |
| 5,322,408 A | 6/1994 | Wooden |
| 5,339,925 A | 8/1994 | Price |
| 5,374,094 A * | 12/1994 | Smith et al. ............. 296/26.05 |
| 5,425,615 A | 6/1995 | Hall et al. |
| 5,611,522 A | 3/1997 | Zaguroll, Jr. |
| 5,725,070 A | 3/1998 | Eldred |
| 5,934,414 A | 8/1999 | Staczek |
| 5,941,342 A | 8/1999 | Lee |
| 5,950,267 A | 9/1999 | Ricci, Jr. |
| 5,957,237 A | 9/1999 | Tigner |
| 6,050,365 A | 4/2000 | Newlin |
| 6,176,495 B1 | 1/2001 | Decker |
| 6,212,832 B1 | 4/2001 | Gao |
| 6,234,272 B1 | 5/2001 | Plentl, Jr. |
| 6,327,992 B1 | 1/2002 | Martin |
| 6,357,548 B1 | 3/2002 | Boyd |
| 6,810,995 B2 | 11/2004 | Warford |
| 6,883,641 B2 | 4/2005 | Julien |
| 6,910,553 B1 | 6/2005 | Lobbe et al. |
| 6,968,925 B1 | 11/2005 | Miyoshi et al. |
| 2003/0051942 A1 | 3/2003 | Atkins |
| 2005/0194807 A1 | 9/2005 | Gonzalez |

* cited by examiner

INTERIOR SPACE EXPANSION SYSTEM

BACKGROUND OF THE INVENTION

1. Field of the Invention

The present invention relates generally to space expansion systems and, more particularly, to interior space expansion systems for use with a structure needing collapsible and/or expandable space.

2. Description of the Related Art

Structures and vehicles are often used for varying purposes. For example, construction trailers and recreational vehicles are used to carry people and/or equipment from location to location. When at a location, the structure then must fill a different role. Accordingly, it is difficult to adapt a single structure and/or vehicle to fill both roles well. Even when a structure is not mobile, it may have varying uses based on time of day, time of year, and/or other circumstances wherein a purpose served by the structure may change or shift.

Construction trailers are often built for gravel pit owners who run a spread, including crushers and conveyors. They manage operators who have mobile equipment. The managers often need to get equipment out of the weather, have work space, and have a vantage point sitting above the height of the spread so they can see the whole spread for safety purpose, for control purposes, and/or for communication purposes.

Further, owners of recreational vehicles have a need to maximize space and view, especially when the recreational vehicle is positioned to be used as living space, such as but not limited to when the recreational vehicle may be stopped for a time and used as a home. Accordingly, where a recreational vehicle profile may need to fit within certain parameters for driving, such parameters may substantially decrease available space and/or quality of living conditions therein.

Therefore, attempts have been made at enabling structures to change by lifting a movable structure out from a base structure. In one example, U.S. Patent Application No. 2003/0051942 by Atkins, there is disclosed a mobile, elevating hut with a trailer, a platform, legs connecting the platform to the trailer, and a lifter which can move the platform between a lowered and a raised position where the legs support the platform.

Further, in U.S. Patent Application No. 2005/0194807 by Gonzalez, there is disclosed a unit utilized in the practice of outdoor sports, specifically, but not solely, for stalking and legally hunting animals. Specifically it refers to an automatically and reversibly transformable trailer-to-raised lookout platform from which the animals may be observed for the purpose of filming them, photographing them or hunting them. It is characterized by consisting of a cube-shaped structure with at least one set of wheels and a hitch for connecting it to a towing vehicle, with a roof made up of a platform and an awning which may be raised and lowered by means of telescoping arms located in each corner and activated by an elevation system which raises the platform above the trailer thus forming the floor of an observation and lookout cabin, as well as the awning which at the same time is raised above the platform making between the awning and the platform means for covering the side opening of the cabin. The trailer also has an interior telescoping ladder which connects the inside of the trailer with the inside of the elevated cabin through an access opening in the platform floor of the elevated cabin. The trailer also has at least one side access door.

Still further, in U.S. Pat. No. 5,339,925 to Price, there is disclosed a lift for motor vehicles using hydraulic cylinders powered by a remote electrical hydraulic pump. The hydraulic cylinders lift pistons having an upper distal area adaptable for receiving the payload vehicle. The pistons are rigidly linked to each other at their lower proximal ends by an equalizer beam. The upper distal area of each piston includes a mounting plate for accepting a lifting platform for bearing the payload vehicle. The pistons of the lift raise the payload vehicle using the hydraulic cylinders in connection with a series of chains and pulleys. The pulleys are mounted on the hydraulic cylinders. The chains are attached from an upper chain anchor at the top of the lift structure, to the pulleys on the hydraulic cylinder, and to a lower chain anchor on the equalizer beam. Each hydraulic cylinder is contained within a sleeve fixedly mounted to a cylinder mount post. As the hydraulic cylinders are moved in a vertical direction by the hydraulic pump, the chain and pulley systems force the pistons to move in a vertical clockwise direction in unison.

In some existing systems, a liftable cab is included within a trailer. The trailer may be towed to and from different worksites. Once the trailer is in position, the cab may be lifted out through the roof of the trailer and used as such a vantage point. However, most of the space underneath the cab is substantially occupied by lift mechanisms such as hydraulic scissor-lifts, to lift and lower the cab, and/or access mechanisms such as but not limited to stairs. In a 53-foot trailer, a lift system and/or stair system taking out over 100 square feet of usable space significantly disadvantages use of the trailer for storage, trailer access, and/or working space. Further, many lift systems are complicated, include many parts, and/or are prone to breakage.

What is needed is an interior space expansion system that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available interior space expansion systems. Accordingly, the present invention has been developed to provide an interior space expansion system.

In one embodiment, there is an interior space expansion system for use with a structure needing collapsible and/or expandable space. The interior space expansion system may include one or more of the following: a base structure having an aperture therethrough; a movable structure disposed within a central region of the base structure when in a sunken position and/or substantially exterior the base structure when in an elevated position; and/or a lifting system that may be coupled to the base structure and/or the movable structure.

The lifting system may be configured to transition the movable structure between the sunken and elevated positions through the aperture. It may be that the lifting system is not substantially disposed within the central region of the base structure when the movable structure is in the elevated position. Also, it may be that the lifting system includes one or more of the following: a pulley system that may be disposed within the base structure; a flexible member that may be through the pulley system and/or mechanically coupled to the base structure and/or to the movable structure such that an alteration of an effective length of the flexible member may transition the movable structure between the sunken and elevated positions through the aperture; and/or a motivator functionally coupled to the flexible member such that activation of the motivator alters the effective length of the flexible member.

There may be a cap member coupled to a top of the movable structure and configured to substantially cover the aperture when the movable structure is in the sunken position. There may be a support coupled to the base structure and providing support to the pulley system. There may be a footing extending horizontally from the movable structure and functionally coupling the flexible member thereto. The support may be functionally coupled to the footing such that the support guides vertical motion of the footing. The support may further include a channel with a U-shaped cross-section, or U-shaped channel. The footing may be disposed within the U-shaped channel. The movable structure may include a cab and/or a carriage. The support may further include a stop member configured to prevent exit of the footing from a top of the U-shaped channel. The support may further include a locking system configured to lock the footing at a top portion of the U-shaped channel.

The pulley system may include one or more of the following: a fixed member that may be configured to couple to the flexible member and/or not permit motion of the flexible member at the location of the fixed member; a motivator pulley that may be coupled to the motivator such that motion of the motivator moves the motivator pulley, wherein the motivator pulley is configured to receive the flexible member; and/or a directional pulley that may be disposed to receive the flexible member at a position on the flexible member further from the fixed member than the motivator pulley as measured along the flexible member.

In another embodiment, there may be an interior space expansion system for use with a structure needing collapsible and/or expandable space. The interior space expansion system may include a trailer and/or recreational vehicle. There may be a movable structure within the trailer and/or recreational vehicle. The movable structure may include a cab; a carriage; and/or a footing extending from the carriage. There may be a guiding support that may be coupled to the trailer and/or disposed in an interior thereof, wherein the guiding support is shaped to couple to the footing and guide the footing along a vertical path defined by the guiding support. There may be a flexible member that may be coupled to the footing and/or extending through the vertical path. There may be a motivator coupled to the flexible member and configured to alter an effective length of the flexible member, thereby lifting or lowering the movable structure.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
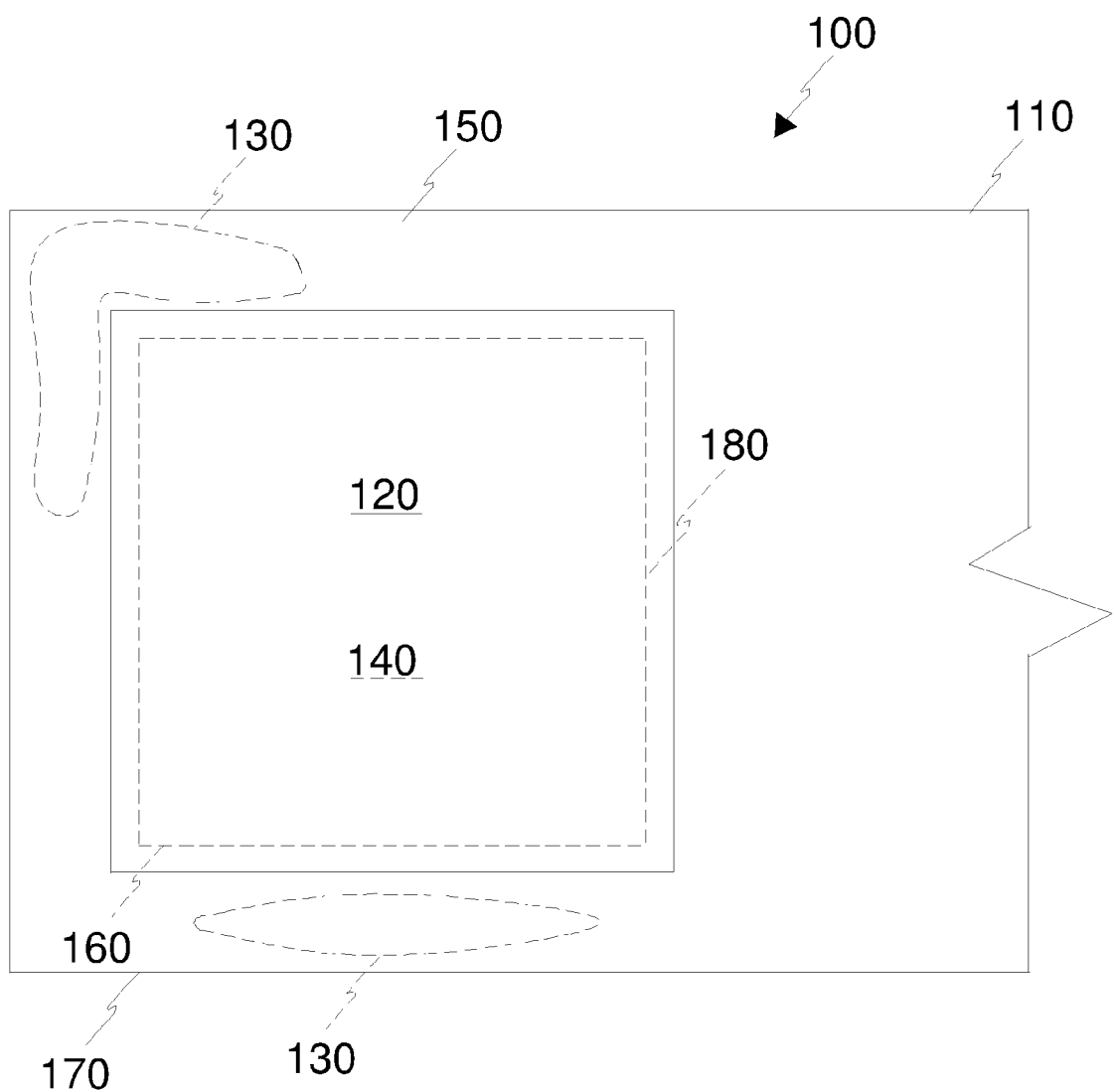
FIG. 1 illustrates a top plan view of an interior space expansion system according to one embodiment of the invention.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to "one embodiment," "an embodiment," or similar language means that a particular feature, structure, or characteristic described in connection with the embodiment is included in at least one embodiment of the present invention. Thus, appearances of the phrases "one embodiment," "an embodiment," and similar language throughout this specification may, but do not necessarily, all refer to the same embodiment, different embodiments, or component parts of the same or different illustrated invention. Additionally, reference to the wording "an embodiment," or the like, for two or more features, elements, etc. does not mean that the features are related, dissimilar, the same, etc. The use of the term "an embodiment," or similar wording, is merely a convenient phrase to indicate optional features, which may or may not be part of the invention as claimed.

Each statement of an embodiment is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The independent embodiments are considered to be able to be combined in whole or in part one with another as the claims and/or art may direct, either directly or indirectly, implicitly or explicitly.

Finally, the fact that the wording "an embodiment," or the like, does not appear at the beginning of every sentence in the specification, such as is the practice of some practitioners, is merely a convenience for the reader's clarity. However, it is the intention of this application to incorporate by reference the phrasing "an embodiment," and the like, at the beginning of every sentence herein where logically possible and appropriate.

Looking to the figures, there is shown an interior space expansion system 100 for use with a structure needing collapsible and/or expandable space according to one embodiment of the invention. The illustrated interior space expansion system 100 includes: a base structure 110 having an aperture 180 therethrough; a movable structure 120 disposed within a central region 140 of the base structure 100 when in a sunken position 240 and substantially exterior the base structure 100 when in an elevated position 230; and a lifting system 130 coupled to the base structure 110 and the movable structure 120.

A base structure 110 may include a great variety of structures, including but not limited to vehicles and buildings. In one embodiment, the base structure 100 may include a trailer, such as those used for transporting goods. In another embodiment, the base structure 110 may include a tower and/or a command structure intended for use as a viewing location. In still another embodiment, the base structure 100 may include a building having one or more walls.

It is envisioned that the aperture 180 may take many forms. In one embodiment, an aperture 180 includes a hole through a ceiling of the base structure 110. In another embodiment, the aperture 180 includes wherein a base structure 100 has no ceiling, other than that which may be provided by a movable structure 120. In still another embodiment, the aperture 180 includes a void at least partially closable.

It is also envisioned that a movable structure 120 may take many forms. In one embodiment, the movable structure 120 includes a movable room, cab, box, pod, control center, and/or shuttle. In one embodiment, the movable structure 120 may include a cross-sectional shape adapted to fit through and/or fill boundaries defining the aperture 180. In another embodiment, the movable structure 120 includes a ceiling, a floor, and a plurality of walls, wherein the floor of the movable structure 120 may form a ceiling of the base structure 110 when the movable structure 120 is in an elevated position 230. The movable structure 120 may include a cab 160 and/or a carriage 320. The illustrated cab 160 includes a plurality of walls for protecting a user therein from the elements. The illustrated carriage 320 is configured to hold and support the cab 160 that may be nestled therein. In the illustrated embodiment, the carriage 320 includes a rectangular annular member including an inset portion wherein may be disposed the cab 160. In one embodiment, the cab 160 includes windows for seeing outside of the cab and/or includes space for instruments, control devices, communication devices, etc. In another embodiment, the carriage 320 includes a framework configured to hold the cab and to substantially form a seal about the boundaries of the aperture 180 when the movable structure 120 is in an elevated position 230, thereby preventing the elements, such as but not limited to rain, wind, dust, sand, water, and/or humidity from substantially entering the base structure 110. In the illustrated embodiment, there is shown a drain tube 360 functionally coupled to the carriage 320 whereby fluid collecting in the carriage 320 and/or between the carriage 320 and the cab 160 may be drained therefrom through the base structure 110 and out a drain orifice 364 disposed in a bottom of the base structure 110. In the illustrated embodiment, the drain tube 360 is coupled to a support 310 and is substantially flexible such that the drain tube 360 is not substantially damaged during transitions of the movable structure 120 between sunken 240 and elevated 230 positions.

While the movable structure 120 is shown to move only vertically from a sunken position 240 to an elevated position 230, it is envisioned that in one embodiment, the movable structure 120 may also move horizontally during a transition between sunken 240 and elevated 230 positions. In one embodiment, the movable structure 120 moves substantially diagonally, vertically then horizontally, horizontally then vertically, spirally, and/or any combinations thereof.

The central region 140 of the base structure 110 includes the portion of space occupied by the movable structure 120 when the movable structure 120 is in the sunken position 240 and generally usable for storage, human passage, and/or workspace. In one embodiment, the central region 140 includes the space occupied by the movable structure 120 in the sunken position 240 up to about an average height of an adult person. In another embodiment, the central region 140 includes a space occupied by the movable structure 120 in the sunken position 240 and not space between adjacent walls of the movable structure 120 and the base structure 110.

Figure 2:
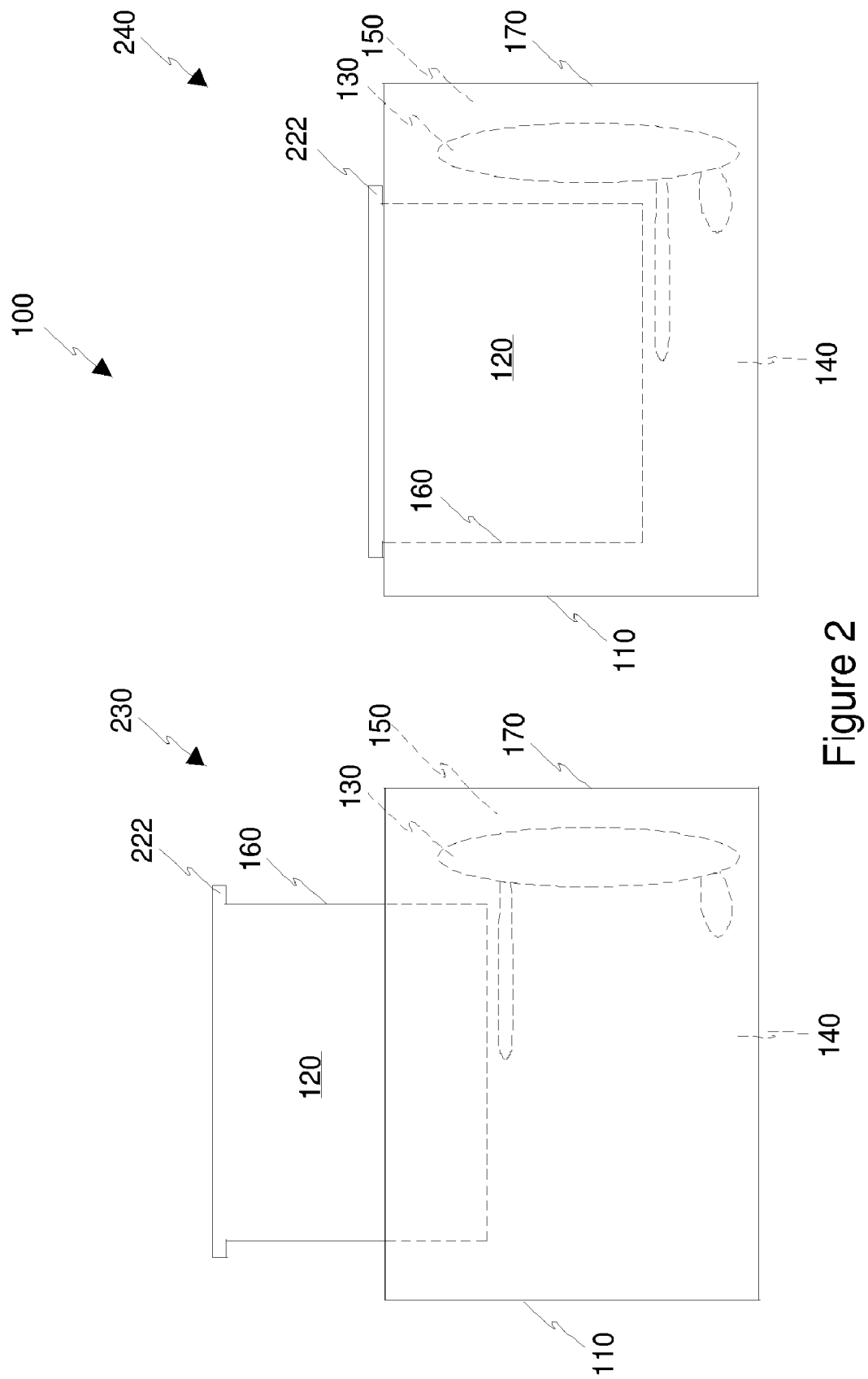
FIG. 2 illustrates side plan views of an interior space expansion system in an elevated position and a sunken position according to one embodiment of the invention.
Figure 3:
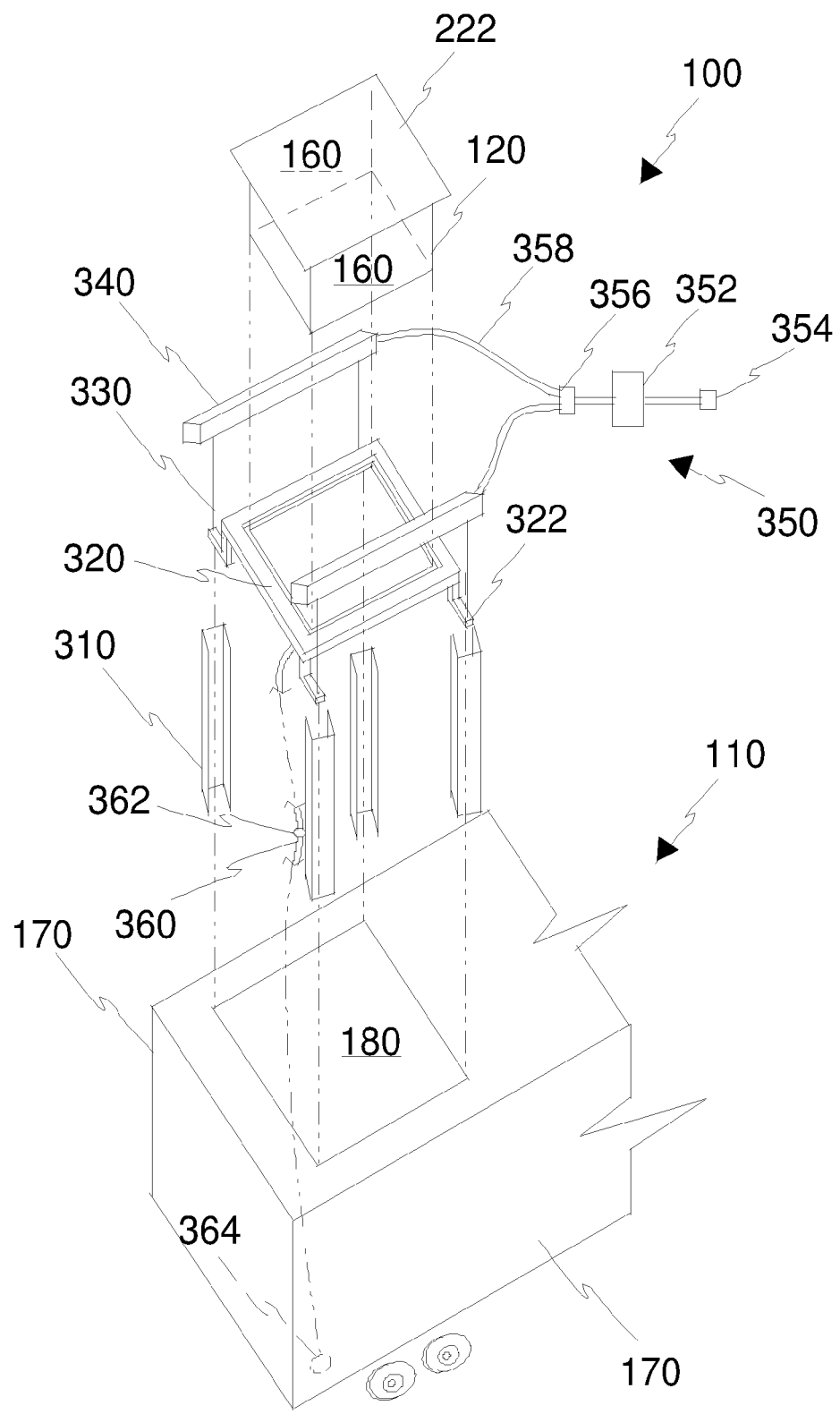
FIG. 3 illustrates an exploded perspective view of an interior space expansion system according to one embodiment of the invention.

The illustrated lifting system 130 is configured to transition the movable structure 120 between the sunken 240 and elevated 230 positions through the aperture 180. The illustrated lifting system 130 is not substantially disposed within the central region 140 of the base structure 110 when the movable structure 120 is in the elevated position 230. The illustrated lifting system(s) 130 of FIGS. 1 and 2 are intentionally shown as amorphic to illustrate this feature for the various embodiments of the invention. In the exemplary embodiment shown in FIG. 2, the lifting system 130 includes one or more portions and/or protrusions that extend into the central region, but do not substantially extend thereto, wherein the extension does not significantly impact use of the central region 140 for uses such as storage, walkway, workspace etc.

More, the illustrated lifting system 130 includes: a pulley system 440 disposed within the base structure 110; a flexible member 330 through the pulley system 440 and mechanically coupled to the base structure 110 and to the movable structure 120 such that an alteration of an effective length of the flexible member 330 may transition the movable structure 120 between the sunken 240 and elevated 230 positions through the aperture 180; and a motivator 410 functionally coupled to the flexible member 330 such that activation of the motivator 410 alters the effective length of the flexible member 330.

The pulley system 440 includes one or more devices and/or members capable of asserting a direction change in a flexible member 330. Non-limiting exemplary embodiments include: pulley wheels, rollers, grooved rollers, low friction posts, and gears. In one embodiment, there are UHMW polyethylene rollers.

The illustrated pulley system 440 includes: a fixed member 442 configured to couple to the flexible member 330 and/or not permit motion of the flexible member 330 at the location of the fixed member 442; a motivator pulley 444 coupled to the motivator 410 such that motion of the motivator 410 moves the motivator pulley 444, wherein the motivator pulley 444 is configured to receive the flexible member 330; and a directional pulley 446 that may be disposed to receive the flexible member 330 at a position on the flexible member 330 further from the fixed member 442 than the motivator pulley 444 as measured along the flexible member 330. The directional pulley 446 is configured to alter a directional path of the flexible member 330.

It is envisioned that variations on the fixed member 442 are plethoric and include embodiments wherein the fixed member 442 includes a bolt, a screw, a fixed coupling device such as a hook or eyelet, a nail, and/or any other device capable of coupling to a flexible member 330 and fixing the location of the coupled portion of the flexible member 330 at the locus of the coupling.

The illustrated motivator pulley 444 includes a double grooved roller rotatably coupled to the motivator 410 such that motion of the motivator 410 induces motion of the motivator pulley 444. Accordingly, the motivator pulley 444 may be threaded with a pair of flexible members 330. Wherein the illustrated motivator pulley 444 is disposed at a location relative to the fixed member 442 and the directional pulley 446 such that the path length of the flexible member 330 from the fixed member 442 to the directional pulley 446 through the motivator pulley 444 may be increased and/or decreased by motion of the motivator pulley 444, motion of the motivator pulley 444 alters an effective length of any flexible member 330 threaded so therethrough. Wherein the relative locations of portions of the pulley system 440 are as shown, with the flexible member 330 doubling back from the motivator pulley 444, motion of the motivator pulley corresponds to about double such change in effective length of the flexible member 330. Accordingly, wherein the motivator 410 may be a hydraulic cylinder with a stroke length of 48 inches, it may be possible to alter an effective length of a flexible member 330 by about 96 inches, thereby enabling substantial lifting of the movable structure 120 with a reduced space requirement for the lifting system 130. The directional pulley 446 may be configured to adjust a threaded path of the flexible member 330 for appropriate distribution of tension therefrom.

The illustrated flexible member 330 may be a chain, rope, filament, cable, cord, and/or any other elongated device and/or material capable of transmitting tension through a bend. In one embodiment, the flexible member 330 includes a chain flexible through a single plane, such as in a bicycle chain. The illustrated flexible member 330 is coupled to a footing 310 by a footing bolt 432 disposed through the footing 310. In one embodiment, there is a chain connected to a one-inch bolt that is about seven inches long. The chain mates to teeth in the bolt and a pin is passed through the chain thereby enhancing the coupling of the chain and the teeth. The bolt is threaded and goes through a hole in the footing. The bolt is secured on each side by a nut, thereby enabling adjustments to the height of the footing by adjusting the bolt and nuts.

The illustrated motivator 410 includes a fixed cylinder 412 and a traveling cylinder 414. The fixed cylinder 412 is fixedly coupled to the housing 420 by a housing coupling 416, that may be a bolt, a screw, a shell, a hinge, a pivot, a weld, and/or any other means of coupling the fixed cylinder 412 to the housing 420 such that the fixed cylinder does not move laterally. The traveling cylinder 414 is slidably disposed within the fixed cylinder 412 as is common for hydraulic cylinders. Accordingly, when hydraulic pressure is applied to the motivator 410, the traveling cylinder 414 may move. The illustrated motivator pulley 444 is coupled to the traveling cylinder 414.

There is shown a cap member 222 coupled to a top of the movable structure 120 and configured to substantially cover the aperture 180 when the movable structure 120 is in the sunken position 240. In one embodiment, the cap member 222 is the top of the movable structure 120. In the illustrated embodiment, the cap member 222 extends from the top of the movable structure 120 and out the sides of the movable structure 120 thereby capping the aperture 180 when the movable structure 120 is in a sunken position 240. Accordingly, the cap 222 may help prevent the elements from entering the base structure 110.

There is shown a support 310 coupled to the base structure 110 and providing support to the pulley system 440. The illustrated support 310 is functionally coupled to the footing 310 such that the support 310 guides vertical motion of the footing 310. The illustrated support 310 is shaped as a U-shaped channel 310. The illustrated support 310 further includes a stop member 616 configured to prevent exit of the footing 310 from a top of the U-shaped channel 310. The illustrated support 310 is coupled to a base plate 510 that is coupled to the base structure 110 by bolts 512. The illustrated footing 310 is a substantially rigid L-shaped member.

The illustrated support 310 further includes a locking system 610 configured to lock the footing 310 at a top portion of the U-shaped channel 310. The illustrated locking system 610 includes a ridge 612 disposed at a top portion of the support and extending from the support 310. The illustrated ridge 612 includes a plurality of holes 614 therethrough, wherein may be disposed a locking rod 618 upon which may rest the footing 310 when the movable structure is in an elevated position 230, thereby reducing load on the lifting system 130. There is illustrated a coupling cap 450 configured to enhance coupling between the housing 420 and the support 322.

There is shown a footing 310 extending horizontally from the movable structure 120 and functionally coupling the flexible member 330 thereto. The illustrated footing 310 is disposed within the U-shaped channel 310. In one embodiment, the footing 310 and the support 310 are adapted to channel motion of the movable structure along a vertical path for transitioning the movable structure between the sunken 240 and elevated 230 position. Non-limiting exemplary embodiments of such include: post and ring, tab and groove, slot and T, and ratcheting variations thereof.

In the illustrated embodiment, the movable structure 120 is free floating on a plurality of flexible members 330. The illustrated footings 322 and supports 310 are disposed and spaced such that the footings 322 may shift around, but not so much so that a footing 310 may leave a support 310. In one embodiment, there is a half inch tolerance such that when a footing 310 is fully pressed against a support 310 no other footing 310 is closer than a half inch from being able to exit the corresponding support 310. Further, in the illustrated embodiment, there is a safety pin 616 coupled to a top portion of the support 310 such that the footing 310 may not travel beyond the top of the U-shaped channel. Accordingly, wherein there may be a gust of wind and or any other force that may tip the movable structure 120, such may be prevented from dislodging the movable structure 120 from the support 310.

Figure 4:
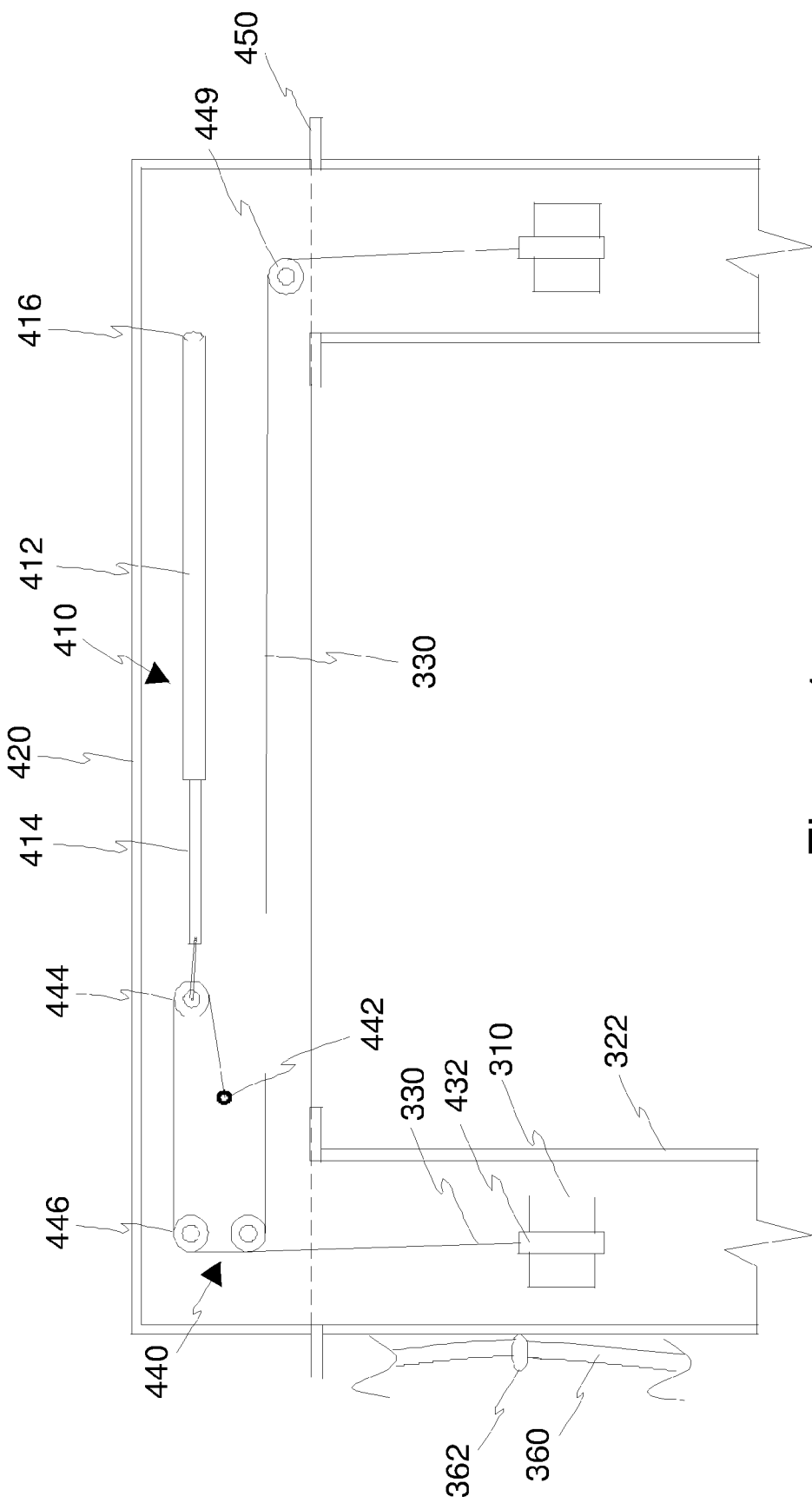
FIG. 4 illustrates a side plane cut-away view of an interior space expansion system according to one embodiment of the invention.
Figure 5:
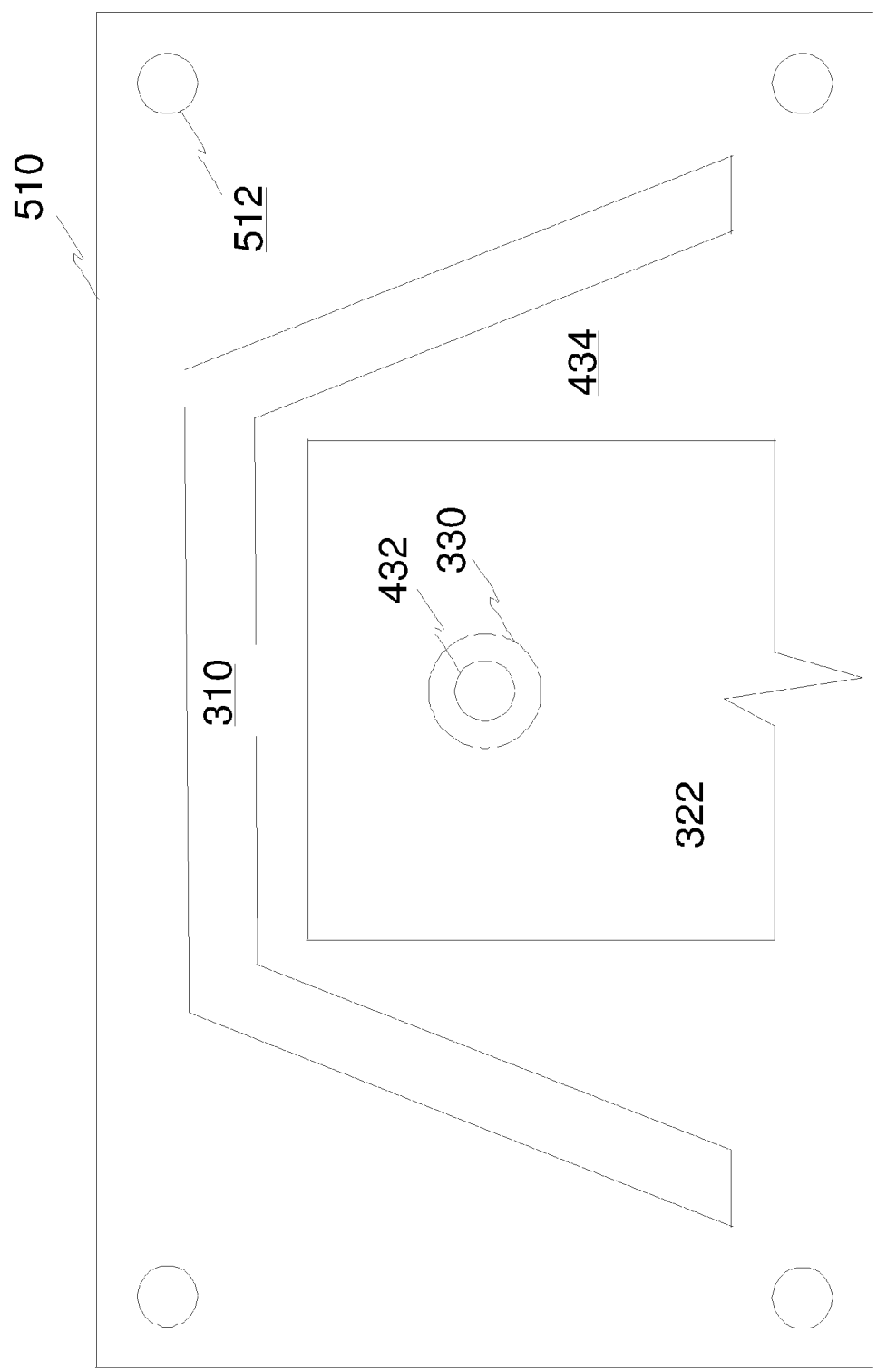
FIG. 5 illustrates a top plane cut-away view of a support and footing of an interior space expansion system according to one embodiment of the invention.
Figure 6:
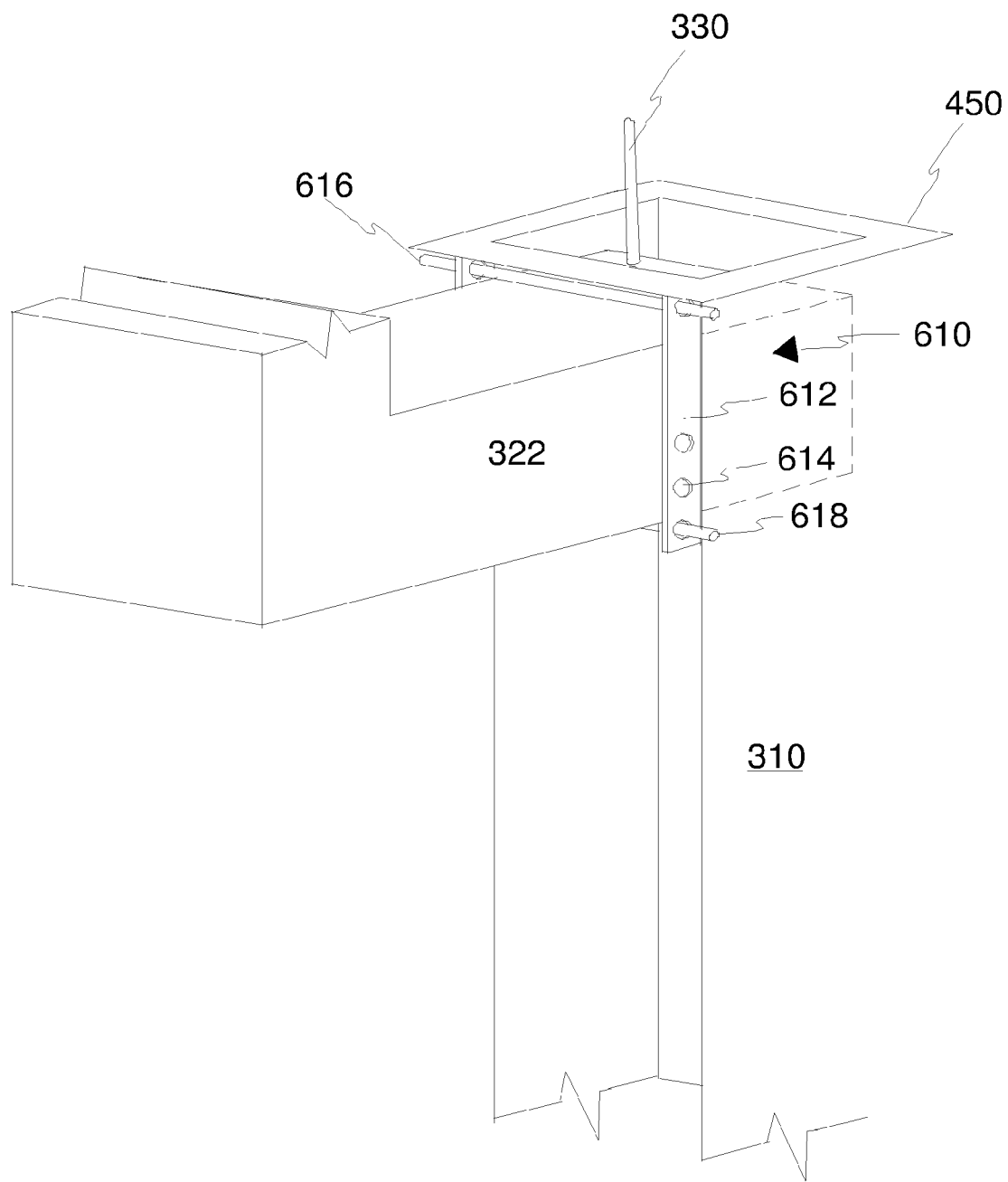
FIG. 6 illustrates a perspective view of a support and footing of an interior space expansion system according to one embodiment of the invention.

In operation of the illustrated embodiment, the movable structure 120 is supported and guided by the lift system 130 and the four supports 310. The illustrated lift system 130 includes a pair of systems as shown in FIG. 4, wherein a single motivator 410 couples to a pair of flexible members 330 and each flexible member 330 couples to a footing 310. The illustrated lift system 130 is disposed in a peripheral region 150 between adjacent walls 160 and 170 of the base structure 110 and the movable structure 120. Accordingly, there are two motivators 410 and two pulley systems 440, each housed in a housing 420 and each supported on or adjacent to a pair of supports 310. A user may activate the lift system 130 through a control module 354 that controls a hydraulic system 352 including a pressure compensated flow divider 356 wherethrough hydraulic pressure may be applied substantially equally to the pair of hydraulic cylinders 410, thereby facilitating level transitioning between sunken 240 and elevated 230 positions.

In an embodiment, the interior space expansion system 100 may include a trailer and/or recreational vehicle. There may be a movable structure 120 within the trailer and/or recreational vehicle. The movable structure 120 may include a cab 160; a carriage 320; and/or a footing 310 extending from the carriage 320. There may be a guiding support 310 that may be coupled to the trailer and/or disposed in an interior thereof, wherein the guiding support 310 is shaped to couple to the footing 310 and guide the footing 310 along a vertical path defined by the guiding support 310. There may be a flexible member 330 that may be coupled to the footing 310 and/or extending through the vertical path. There may be a motivator 410 coupled to the flexible member 330 and configured to alter an effective length of the flexible member 330, thereby lifting or lowering the movable structure.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

For example, although the illustrated lift system is substantially disposed between adjacent walls of the base structure and movable structure, it may also be disposed under and coupled to the movable structure as long as such does not substantially fill space in the central region. In another embodiment, the lifting system is substantially disposed within the movable structure.

Finally, it is envisioned that the components of the device may be constructed of a variety of materials, including but not limited to metals, plastics, resins, fibers, ceramics, and composites.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. An interior space expansion system for use with a structure needing collapsible and expandable space, comprising:
    a) a base structure having an aperture therethrough;
    b) a movable structure substantially disposed within a central region of the base structure when in a sunken position and substantially exterior the base structure when in an elevated position;
    c) a lifting system coupled to the base structure and the movable structure, wherein the lifting system transitions the movable structure between the sunken and elevated positions through the aperture, the lifting system not substantially disposed within the central region of the base structure when the movable structure is in the elevated position, wherein the lifting system comprises:
        c1) a pulley system disposed within the base structure; a flexible member through the pulley system and mechanically coupled to the base structure and to the movable structure such that an alteration of an effective length of the flexible member transitions the movable structure between the sunken and elevated positions through the aperture; and
        c2) a motivator functionally coupled to the flexible member such that activation of the motivator alters the effective length of the flexible member;
    d) a support, for providing support to the pulley system, coupled to the base structure; and
    e) a footing extending horizontally from the movable structure and functionally coupling the flexible member thereto.

2. The interior space expansion system of claim 1, further comprising a cap member coupled to a top of the movable structure and configured to substantially cover the aperture when the movable structure is in the sunken position.

3. The interior space expansion system of claim 1, wherein the support is functionally coupled to the footing such that the support guides vertical motion of the footing.

4. The interior space expansion system of claim 3, wherein the support further comprises a U-shaped channel, wherein the footing is disposed.

5. The interior space expansion system of claim 4, wherein the movable structure comprises a cab and a carriage.

6. The interior space expansion system of claim 5, wherein the support further comprises a stop member configured to prevent exit of the footing from a top of the U-shaped channel.

7. The interior space expansion system of claim 6, wherein the support further comprises a locking system configured to lock the footing at a top portion of the U-shaped channel.

8. The interior space expansion system of claim 7, wherein the pulley system comprises:
    a) a fixed member coupled to the flexible member so as to not permit motion of the flexible member at the location of the fixed member;

b) a motivator pulley coupled to the motivator such that motion of the motivator moves the motivator pulley, wherein the motivator pulley receives the flexible member; and c) a directional pulley receiving the flexible member at a position on the flexible member further from the fixed member than the motivator pulley as measured along the flexible member.

9. A interior space expansion system for use with a structure needing collapsible and expandable space, comprising:

a) a base structure having an aperture therethrough;

b) a movable structure disposed within a central region of the base structure when in a sunken position and substantially exterior the base structure when in an elevated position;

c) a lifting system coupled to the base structure and the movable structure, configured to transition the movable structure between the sunken and elevated positions through the aperture, the lifting system not substantially disposed within the central region of the base structure when the movable structure is in the elevated position; wherein the lifting system comprises:

c1) a pulley system disposed within the base structure;

c2) a flexible member through the pulley system and mechanically coupled to the base structure and to the movable structure such that an alteration of an effective length of the flexible member transitions the movable structure between the sunken and elevated positions through the aperture; and c3) a motivator functionally coupled to the flexible member such that activation of the motivator alters the effective length of the flexible member; and d) a footing extending from the movable structure and functionally coupling the flexible member thereto.

10. The interior space expansion system of claim 9, further comprising a support coupled to the base structure and providing support to the pulley system.

11. The interior space expansion system of claim 9, wherein the support is functionally coupled to the footing such that the support guides vertical motion of the footing.

12. The interior space expansion system of claim 9, wherein the movable structure comprises a cab and a carriage.

13. The interior space expansion system of claim 9, wherein the support further comprises a locking system configured to lock the footing at a top portion of the U-shaped channel.

14. The interior space expansion system of claim 9, wherein the pulley system comprises:

a) a fixed member configured to couple to the flexible member and not permit motion of the flexible member at the location of the fixed member;

b) a motivator pulley coupled to the motivator such that motion of the motivator moves the motivator pulley, wherein the motivator pulley is configured to receive the flexible member; and c) a directional pulley disposed to receive the flexible member at a position on the flexible member further from the fixed member than the motivator pulley as measured along the flexible member.

15. The interior space expansion system of claim 9, wherein the base structure is selected from the group consisting of trailer and recreational vehicle.

16. An interior space expansion system for increasing interior space, comprising:

a) a trailer;

b) a movable structure within the trailer and including:

b1) a cab;

b2) a carriage; and b3) a footing extending from the carriage;

c) a guiding support coupled to the trailer and disposed in an interior thereof, wherein the guiding support is shaped to couple to the footing and guide the footing along a vertical path defined by the guiding support;

d) a flexible member coupled to the footing and extending through the vertical path; and e) a motivator coupled to the flexible member and configured to alter an effective length of the flexible member, thereby lifting or lowering the movable structure.

* * * * *